United States Patent
Zhang et al.

(10) Patent No.: US 11,479,649 B2
(45) Date of Patent: Oct. 25, 2022

(54) SCRATCH-RESISTANT FLOOR AND METHOD FOR PRODUCING SAME, AND FLOOR COATING

(71) Applicant: CHANGZHOU BEMATE HOME TECHNOLOGY CO., LTD., Jiangsu (CN)

(72) Inventors: Xiaoling Zhang, Jiangsu (CN); Zhiyuan Xiao, Jiangsu (CN); Yanhui Li, Jiangsu (CN)

(73) Assignee: CHANGZHOU BEMATE HOME TECHNOLOGY CO., LTD., Changzhou (CN)

( * ) Notice: Subject to any disclaimer, the term of this patent is extended or adjusted under 35 U.S.C. 154(b) by 0 days.

(21) Appl. No.: 17/366,001

(22) Filed: Jul. 1, 2021

(65) Prior Publication Data

US 2021/0332205 A1    Oct. 28, 2021

Related U.S. Application Data

(63) Continuation of application No. PCT/CN2021/093860, filed on May 14, 2021.

(30) Foreign Application Priority Data

Dec. 16, 2020   (CN) .......................... 202011488104.3

(51) Int. Cl.
| | |
|---|---|
| *C08J 7/046* | (2020.01) |
| *E04F 15/10* | (2006.01) |
| *C09D 7/47* | (2018.01) |
| *C09D 175/04* | (2006.01) |

(52) U.S. Cl.
CPC ................ *C08J 7/046* (2020.01); *C09D 7/47* (2018.01); *C09D 175/04* (2013.01); *E04F 15/105* (2013.01); *C08J 2475/04* (2013.01); *E04F 2290/044* (2013.01)

(58) Field of Classification Search
CPC ...... C08J 7/045; C08J 2475/04; E04F 15/105; E04F 2290/044; C09D 7/47; C09D 175/04
USPC ....................................... 427/385.5
See application file for complete search history.

(56) References Cited

U.S. PATENT DOCUMENTS

2017/0009014 A1    1/2017  Bhagwagar et al.

FOREIGN PATENT DOCUMENTS

| CN | 1246503    A |   | 3/2000 |
|----|-------------|---|--------|
| CN | 102746777  B |   | 4/2014 |
| CN | 110028887  A |   | 7/2019 |
| CN | 1246503    | * | 3/2020 |
| CN | 111019451  A |   | 4/2020 |
| CN | 111995941  A |   | 11/2020 |
| CN | 112375478  A |   | 2/2021 |
| CN | 112625573  A |   | 4/2021 |
| JP | H04359032  A |   | 12/1992 |
| KR | 20070056922 A |   | 6/2007 |

* cited by examiner

*Primary Examiner* — Hui H Chin
(74) *Attorney, Agent, or Firm* — Wayne IP LLC

(57) ABSTRACT

A floor coating, which is prepared from 55-70% by weight of an epoxy-modified polyurethane resin, 5-10% by weight of $Al_2O_3$, 10-25% by weight of SiC, 0.4-1% by weight of a leveling agent, 0.3-1% by weight of a dispersant, 5-10% by weight of a solvent and 0.2-0.8% by weight of a curing agent. A degree of polymerization of the epoxy-modified polyurethane resin is 80-100. A scratch-resistant floor and a preparation method thereof are also disclosed herein.

17 Claims, No Drawings

SCRATCH-RESISTANT FLOOR AND METHOD FOR PRODUCING SAME, AND FLOOR COATING

CROSS-REFERENCE TO RELATED APPLICATIONS

This application is a continuation of International Patent Application No. PCT/CN2021/093860, filed on May 14, 2021, which claims the benefit of priority from Chinese Patent Application No. 202011488104.3, filed on Dec. 16, 2020. The content of the aforementioned application, including any intervening amendments thereto, is incorporated herein by reference in its entirety.

TECHNICAL FIELD

This application relates to floor processing, and more particularly to a scratch-resistant floor and a method for producing the same, and a floor coating.

BACKGROUND

Polyvinyl chloride (PVC) floor is a lightweight floor decoration material, which is popular around the world, especially in Japan, South Korea, US and European countries. It was introduced in the Chinese market in 1980s, and has been widely used in many places, such as homes, hospitals, schools, office buildings, factories, supermarkets and shopping malls, in large and medium-sized cities in China.

However, the undesirable scratch resistance has always limited the application of the PVC floor. Currently, increasing the thickness of the PVC transparent film is a common way to improve the scratch resistance of the PVC floor; however, it fails to effectively improve the surface scratch resistance.

SUMMARY

A first objective of the present disclosure is to provide a floor coating to solve the above-mentioned problems.

A second objective of the present disclosure is to provide a scratch-resistant floor containing the above-mentioned floor coating.

A third objective of the present disclosure is to provide a method for producing the above-mentioned scratch-resistant floor.

The technical solutions of the present disclosure are described as follows.

In a first aspect, the present disclosure provides a floor coating, wherein the floor coating is prepared from 55-70% by weight of an epoxy-modified polyurethane resin, 5-10% by weight of $Al_2O_3$, 10-25% by weight of SiC, 0.4-1% by weight of a leveling agent, 0.3-1% by weight of a dispersant, 5-10% by weight of a solvent and 0.2-0.8% by weight of a curing agent;

wherein a degree of polymerization of the epoxy-modified polyurethane resin is 80-100.

In some embodiments, the floor coating is prepared from 61.5-65% by weight of the epoxy-modified polyurethane resin, 8-10% by weight of $Al_2O_3$, 18-20% by weight of SiC, 0.5-1% by weight of the leveling agent, 0.5-1% by weight of the dispersant, 7.5-10% by weight of the solvent and 0.5-0.8% by weight of the curing agent.

In a second aspect, the present disclosure provides a scratch-resistant floor, wherein a surface of the scratch-resistant floor is provided with a scratch-resistant coating layer; and the scratch-resistant coating layer contains the floor coating mentioned above.

In some embodiments, the scratch-resistant coating layer comprises a primer layer and a finish paint layer; and the finish paint layer contains the floor coating mentioned above.

In some embodiments, a content of a primer in the primer layer is 10-15 $g/m^2$; and a content of a finish paint in the finish paint layer is 15-25 $g/m^2$.

In some embodiments, the scratch-resistant floor further comprises a substrate layer; the scratch-resistant coating layer is arranged on one side surface of the substrate layer; the substrate layer comprises a substrate; the primer is roll-coated on a side surface of the substrate to form the primer layer; the finish paint is roll-coated on a surface of the primer layer to form the finish paint layer; and the finish paint layer comprises the floor coating.

In some embodiments, the substrate layer is a polyvinyl chloride (PVC) coated substrate layer.

In some embodiments, a thickness of the substrate layer is 3-6 mm.

In some embodiments, the scratch-resistant floor further comprises a buffer layer; and the buffer layer is arranged on the other side surface of the substrate layer.

In some embodiments, a thickness of the buffer layer is 1-1.5 mm.

In a third aspect, the present disclosure provides a method for producing the scratch-resistant floor mentioned above, which comprises:

preparing a scratch-resistant coating layer containing the floor coating; and applying the scratch-resistant coating layer on a substrate to produce the scratch-resistant floor.

In some embodiments, a preparation of the scratch-resistant coating layer comprises:

applying the floor coating by roller coating.

In some embodiments, in the roller coating of the floor coating, a conveying speed of a conveyor belt is 8-14 mm/s; a ratio of the conveying speed of the conveyor belt to a rotating speed of a rubber roller is 1:4.5-5.5; and a temperature of the roller coating of the floor coating is 35-40° C.

In some embodiments, when the scratch-resistant coating layer comprises the primer layer, the primer is applied by roller coating.

In some embodiments, in the roller coating of the primer, a conveying speed of a conveyor belt is 8-14 mm/s; a ratio of the conveying speed of the conveyor belt to a rotating speed of a rubber roller is 1:4.5-5.5; and a temperature of the roller coating of the primer is 35-40° C.

In some embodiments, the method further comprises: before the roller coating, preheating a primer, a finish paint and the floor coating.

In some embodiments, the primer, the finish paint and the floor coating are preheated at 35-40° C. for 1-2 h.

In some embodiments, the method further comprises: before preparing the scratch-resistant coating layer, preheating the substrate until a surface temperature of the substrate is no less than 30° C.

In some embodiments, the primer, the finish paint and the floor coating are subjected to curing after the roller coating.

The beneficial effects of the present disclosure are described as follows.

The epoxy-modified polyurethane resin, $Al_2O_3$ and SiC used herein enable the powdered SiC to be wrapped by the epoxy-modified polyurethane resin and to be uniformly dispersed in the floor coating. In addition, the flocs formed by the $Al_2O_3$ support the SiC to prevent the settlement of SiC, such that the SiC is located on the surface of the floor coating, improving the hardness and wear resistance of the floor surface.

DETAILED DESCRIPTION OF EMBODIMENTS

The objectives, technical solutions and beneficial effects of the present disclosure will be further described below with reference to the embodiments. Unless otherwise specified, the operations in the embodiments are carried out in accordance with the conventional conditions or the conditions recommended by the manufacturer. Unless otherwise specified, the reagents and equipment are all commercially available.

The floor coating, the scratch-resistant floor and the method for preparing the scratch-resistant floor will be specifically described below.

In a first aspect, the present disclosure provides a floor coating, which is prepared from 55-70% by weight of an epoxy-modified polyurethane resin, 5-10% by weight of $Al_2O_3$, 10-25% by weight of SiC, 0.4-1% by weight of a leveling agent, 0.3-1% by weight of a dispersant, 5-10% by weight of a solvent and 0.2-0.8% by weight of a curing agent.

In some embodiments, a weight percentage of the epoxy-modified polyurethane resin is 55%, 60%, 65%, 70% or any other value in the range of 55-70%.

In some embodiments, a weight percentage of the $Al_2O_3$ is 5%, 6%, 7%, 8%, 9%, 10% or any other value in the range of 5-10%.

In some embodiments, a weight percentage of the SiC is 10%, 15%, 20%, 25% or any other value in the range of 10-25%.

In some embodiments, a weight percentage of the leveling agent is 0.4%, 0.5%, 0.8%, 1% or any other value in the range of 0.4-1%.

In some embodiments, a weight percentage of the dispersant is 0.3%, 0.5%, 0.8%, 1% or any other value in the range of 0.3-1%.

In some embodiments, a weight percentage of the solvent is 5%, 6%, 7%, 8%, 9%, 10% or any other value in the range of 5-10%.

In some embodiments, a weight percentage of the curing agent is 0.2%, 0.4%, 0.5%, 0.6%, 0.8% or any other value in the range of 0.2-0.8%.

In some embodiments, the floor coating is prepared from 61.5-65% by weight of the epoxy-modified polyurethane resin, 8-10% by weight of $Al_2O_3$, 18-20% by weight of SiC, 0.5-1% by weight of the leveling agent, 0.5-1% by weight of the dispersant, 7.5-10% by weight of the solvent and 0.5-0.8% by weight of the curing agent.

The epoxy-modified polyurethane resin has a good mechanical performance, and a polymerization degree of the epoxy-modified polyurethane resin provided herein is 80-100, which is significantly higher than that of ordinary polyurethane (about 10-20). Under this degree of polymerization, the ductility of the epoxy-modified polyurethane resin is largely improved. Meanwhile, the branching degree of the epoxy-modified polyurethane resin at this degree of polymerization is relatively large, such that it is easy to wrap other powdery raw materials, so as to better protect the powdery raw materials through the subsequent curing process. When the floor surface is scratched, the wrapped raw material can be exposed or separated out to exhibit the scratch resistance. It should be noted that when the degree of polymerization is too high, the powdery raw materials such as SiC will be excessively wrapped by the epoxy-modified polyurethane resin, and cannot be separated out, failing to play a role in resisting the scratch.

The powdery SiC used herein has high hardness and good wear resistance, and thus can effectively improve the wear resistance of the floor when used in the floor coating.

The $Al_2O_3$ is mainly used to form a floc to support the SiC, so as to avoid the settlement in the epoxy-modified polyurethane resin.

In some embodiments, the leveling agent used herein is a siloxane-based leveling agent. The dispersant is an acrylic modified dispersant. The solvent is a reactive monomer such as an acrylic oligomer monomer. The curing agent is a coupling agent or a quinine compound. It should be noted that the leveling agent, the dispersant, the solvent and the curing agent can also be other substances commonly used in the art.

The epoxy-modified polyurethane resin, $Al_2O_3$ and SiC used herein enable the powdered SiC to be wrapped by the epoxy-modified polyurethane resin and to be uniformly dispersed in the floor coating. In addition, the flocs formed by the $Al_2O_3$ support the SiC to prevent the settlement of SiC, such that the SiC is located on the surface of the floor coating, improving the hardness and wear resistance of the floor surface. Furthermore, this disclosure avoids the use of fillers such as barium sulfate and talcum powder.

In a second aspect, the present disclosure provides a scratch-resistant floor, of which a surface is provided with a scratch-resistant coating layer, where the scratch-resistant coating layer contains the floor coating mentioned above.

In some embodiments, the scratch-resistant coating layer includes a primer layer and a finish paint layer. The finish paint layer contains the floor coating. A paint used in the primer layer can be the same as a paint used in the finish paint layer or other primer paints used in the art.

In some embodiments, a content of a primer in the primer layer is 10-15 $g/m^2$, such as 10 $g/m^2$, 11 $g/m^2$, 12 $m/g/m^2$, 13 $g/m^2$, 14 $g/m^2$ and 15 $g/m^2$. A content of a finish paint in the finish paint layer is 15-25 $g/m^2$, such as 15 $g/m^2$, 18 $g/m^2$, 20 $g/m^2$, 22 $g/m^2$ and 25 $g/m^2$.

When the primer and finish paint are coated in accordance with the above-mentioned amount, the floor coating can have better comprehensive properties such as fluidity, adhesion and film-forming property, and have a higher content of SiC, which helps improve the wear resistance of the floor coating. Furthermore, the surface performance of the floor after curing and drying will be better.

In some embodiments, the scratch-resistant floor further includes a substrate layer, and the scratch-resistant coating layer is arranged on one side surface of the substrate layer. The surface is the upper surface of the substrate layer in use. The substrate layer includes a substrate. The primer is roll-coated on a side surface of the substrate to form the primer layer, and the finish paint is roll-coated on a surface of the primer layer to form the finish paint layer. The finish paint layer includes the floor coating.

In some embodiments, the substrate layer is a polyvinyl chloride (PVC) coated substrate layer. A thickness of the substrate layer is 3-6 mm, such as 3 mm, 4 mm, 5 mm and 6 mm.

In some embodiments, the scratch-resistant floor further comprises a buffer layer, and the buffer layer is arranged on the other side surface of the substrate layer. The surface is the bottom surface of the substrate layer in use.

In some embodiments, a thickness of the buffer layer is 1-1.5 mm, such as 1 mm, 1.1 mm, 1.2 mm, 1.3 mm, 1.4 mm and 1.5 mm.

It should be noted that the scratch-resistant floor can also be provided with other functional layers as needed.

In a third aspect, the present disclosure provides a method for producing the scratch-resistant floor mentioned above, including:

preparing a scratch-resistant coating layer containing the floor coating mentioned above on a substrate.

In some embodiments, a preparation of the scratch-resistant coating layer includes applying the floor coating by roller coating. An equipment used in the roller coating is a commonly-used roller-coating equipment. The substrate layer includes a substrate. The primer is roll-coated on a side surface of the substrate to form the primer layer, and the finish paint is roll-coated on a side surface of the primer layer to form the finish paint layer. The finish paint layer includes the floor coating.

In some embodiments, in the roller coating, a conveying speed of a conveyor belt is 8-14 mm/s, such as 8 mm/s, 10 mm/s, 12 mm/s and 14 mm/s. A ratio of the conveying speed of the conveyor belt to a rotating speed of a rubber roller is 1:4.5-5.5, such as 1:4.5, 1:5 and 1:5.5. Too high ratio of the conveying speed of the conveyor belt to the rotating speed of the rubber roller may lead to coating voids, whereas too low will cause the orange-peel appearance on the surface due to the accumulation of paint.

Temperature of the roller coating is 35-40° C., such as 35° C., 38° C. and 40° C. The temperature of 35-40° C. is beneficial to leveling, such that the floor surface is smooth without burrs, and the scratch resistance of the floor is improved. The temperature of the roller coating refers to a temperature in a chamber of the roller coating equipment when the floor coating is roll-coated on the substrate.

The roller-coating amount is 15-25 g/m², such as 15 g/m², 20 g/m² and 25 g/m².

When the scratch-resistant coating layer includes the primer layer, the primer is applied also by roller coating. In some embodiments, the conveying speed of the conveyor belt is 8-14 mm/s. The ratio of the conveying speed of the conveyor belt to the rotating speed of the rubber roller is 1:4.5-5.5. The temperature of the roller coating of the primer is 35-40° C. The roller-coating amount is 10-15 g/m².

The method further includes the following steps. Before the roller coating, the materials to be roll-coated (the primer, the finish paint and the floor coating) are preheated. The preheating can be carried out using an infrared heating device.

In some embodiments, the materials to be roll-coated are preheated at 35-40° C. (such as 35° C., 38° C. and 40° C.) for 1-2 h (such as 1 h, 1.5 h and 2 h). The preheating makes the materials to be roll-coated have good fluidity and ductility.

In some embodiments, the method further includes preheating the substrate until a surface temperature of the substrate is no less than 30° C. before preparing the scratch-resistant coating layer, such that the temperature of the substrate is close to the temperature of the floor coating or the primer, increasing the fluidity of the floor coating or the primer after being coated.

In some embodiments, the primer, the finish paint and the floor coating are subjected to curing after the roller coating.

The above-mentioned floor coating has simple preparation, and thus is suitable for industrial production. This method can further improve the scratch resistance of the scratch-resistant floor.

The technical features and beneficial effects of the present disclosure will be further described below with reference to the following embodiments.

Example 1

Provided herein is a scratch-resistant floor, which includes a buffer layer, a PVC coated substrate layer and a scratch-resistant coating layer from bottom to top. The scratch-resistant coating layer is composed of a primer layer and a finish paint layer.

A thickness of the buffer layer is 1 mm. A thickness of the PVC coated substrate layer is 3 mm. A content of a primer in the primer layer is 10 g/m², and a content of a finish paint in the finish paint layer is 15 g/m².

The finish paint is a floor coating, which is prepared from 55% by weight of an epoxy-modified polyurethane resin, 10% by weight of $Al_2O_3$, 25% by weight of SiC, 0.5% by weight of a leveling agent, 0.5% by weight of a dispersant, 8.8% by weight of a solvent and 0.2% by weight of a curing agent.

The primer is prepared from 50% by weight of an epoxy-modified polyurethane resin, 20% by weight of $Al_2O_3$, 8% by weight of SiC, 8% by weight of a solvent, 8% by weight of $BaSO_4$, 3.5% by weight of a talcum powder, 1% by weight of a leveling agent, 1% by weight of a dispersant and 0.5% by weight of a curing agent.

The degree of polymerization of the epoxy-modified polyurethane resin in the finish paint is 80 (BASF SE, Germany), and the degree of polymerization of the epoxy-modified polyurethane resin in the primer is 15 (BASF SE, Germany). The leveling agents in the finish paint and primer are both a silicone-modified leveling agent (BYK, Germany). The dispersants in the finish paint and primer are both an acrylic-modified dispersant (BYK, Germany). The solvents in the finish paint and primer are both an acrylic oligomer monomer. The curing agents in the finish paint and primer are both a universal curing agent (516).

The scratch-resistant floor is provided with the buffer layer, the PVC coated substrate layer and the scratch-resistant coating layer according to the above-mentioned structure. The primer and finish paint are preheated at 35° C. for 2 h, and the substrate is preheated at 35° C. until its temperature is the same as that of the primer and the finish paint. Then the primer is applied on the upper surface of the PVC coated substrate layer by roller coating, and the finish paint is applied on the surface of the primer layer by roller coating. After the roller coating, the primer layer and the finish paint layer are cooled and cured.

During the roller coating processes of the primer and finish paint, the conveying speed of the conveyor belt is 8 mm/s; the ratio of the conveying speed of the conveyor belt to the rotating speed of the rubber roller is 1:4.5; the temperature of the roller coating is 35° C.; the roller-coating amount of the primer is 10 g/m²; and the roller-coating amount of the finish paint is 15 g/m².

Example 2

Provided herein is a scratch-resistant floor, which includes a buffer layer, a PVC coated substrate layer and a scratch-resistant coating layer from bottom to top. The scratch-resistant coating layer is composed of a primer layer and a finish paint layer.

A thickness of the buffer layer is 1.2 mm. A thickness of the PVC coated substrate layer is 4.5 mm. A content of a primer in the primer layer is 12.5 g/m², and a content of a finish paint in the finish paint layer is 20 g/m².

The finish paint is a floor coating, which is prepared from 70% by weight of an epoxy-modified polyurethane resin, 5% by weight of $Al_2O_3$, 15% by weight of SiC, 1% by weight of a leveling agent, 1% by weight of a dispersant, 7.2% by weight of a solvent and 0.8% by weight of a curing agent.

The primer is prepared from 50% by weight of an epoxy-modified polyurethane resin, 20% by weight of $Al_2O_3$, 8% by weight of SiC, 8% by weight of a solvent, 8% by weight of $BaSO_4$, 3.5% by weight of a talcum powder, 1% by weight of a leveling agent, 1% by weight of a dispersant and 0.5% by weight of a curing agent.

The degree of polymerization of the epoxy-modified polyurethane resin in the finish paint is 90 (BASF SE, Germany), and the degree of polymerization of the epoxy-modified polyurethane resin in the primer is 15 (BASF SE, Germany). The leveling agents in the finish paint and primer are both a silicone-modified leveling agent (BYK, Germany). The dispersants in the finish paint and primer are both an acrylic-modified dispersant (BYK, Germany). The solvents in the finish paint and primer are both an acrylic oligomer monomer. The curing agents in the finish paint and primer are both a universal curing agent (516).

The scratch-resistant floor is provided with the buffer layer, the PVC coated substrate layer and the scratch-resistant coating layer according to the above-mentioned structure. The primer and finish paint are preheated at 38° C. for 1.5 h, and the substrate is preheated at 38° C. until its temperature is the same as that of the primer and the finish paint. Then the primer is applied on the upper surface of the PVC coated substrate layer by roller coating. After the roller coating, the primer layer and the finish paint layer are cooled and cured.

During the roller coating processes of the primer and finish paint, the conveying speed of the conveyor belt is 12 mm/s; the ratio of the conveying speed of the conveyor belt to the rotating speed of the rubber roller is 1:5; the temperature of the roller coating is 38° C.; he roller-coating amount of the primer is 12.5 g/m$^2$; and the roller-coating amount of the finish paint is 20 g/m$^2$.

Example 3

Provided herein is a scratch-resistant floor, which includes a buffer layer, a PVC coated substrate layer and a scratch-resistant coating layer from bottom to top. The scratch-resistant coating layer is composed of a primer layer and a finish paint layer.

A thickness of the buffer layer is 1.5 mm. A thickness of the PVC coated substrate layer is 6 mm. A content of a primer in the primer layer is 15 g/m$^2$, and a content of a finish paint in the finish paint layer is 25 g/m$^2$.

The finish paint is a floor coating, which is prepared from 60% by weight of an epoxy-modified polyurethane resin, 8% by weight of $Al_2O_3$, 19.5% by weight of SiC, 1% by weight of a leveling agent, 1% by weight of a dispersant, 10% by weight of a solvent and 0.8% by weight of a curing agent.

The primer is prepared from 50% by weight of an epoxy-modified polyurethane resin, 20% by weight of $Al_2O_3$, 8% by weight of SiC, 8% by weight of a solvent, 8% by weight of $BaSO_4$, 3.5% by weight of a talcum powder, 1% by weight of a leveling agent, 1% by weight of a dispersant and 0.5% by weight of a curing agent.

The degree of polymerization of the epoxy-modified polyurethane resin in the finish paint is 100 (BASF SE, Germany), and the degree of polymerization of the epoxy-modified polyurethane resin in the primer is 15 (BASF SE, Germany). The leveling agents in the finish paint and primer are both a silicone-modified leveling agent (BYK, Germany). The dispersants in the finish paint and primer are both an-acrylic modified dispersants (BYK, Germany). The solvents in the finish paint and primer are both an acrylic oligomer monomer. The curing agents in the finish paint and primer are both a universal curing agent (516).

The scratch-resistant floor is provided with the buffer layer, the PVC coated substrate layer and the scratch-resistant coating layer according to the above-mentioned structure. The primer and finish paint are preheated at 40° C. for 1 h, and the substrate is preheated at 40° C. until its temperature is the same as that of the primer and the finish paint. Then the primer is applied on the upper surface of the PVC coated substrate layer by roller coating, and the finish paint is applied on the surface of the primer layer by roller coating. After the roller coating, the primer layer and the finish paint layer are cooled and cured.

During the roller coating processes of the primer and finish paint, he conveying speed of the conveyor belt is 14 mm/s; the ratio of the conveying speed of the conveyor belt to the rotating speed of a rubber roller is 1:5.5; the temperature of the roller coating is 40° C.; the roller-coating amount of the primer is 15 g/m$^2$; and the roller-coating amount of the finish paint is 25 g/m$^2$.

Example 4

This example is basically the same as Example 1 except that the primer is prepared from 65% by weight of an epoxy-modified polyurethane resin, 8.5% by weight of $Al_2O_3$, 20% by weight of SiC, 0.4% by weight of a leveling agent, 0.3% by weight of a dispersant, 5% by weight of a solvent and 0.8% by weight of a curing agent.

Example 5

This example is basically the same as Example 1 except that the primer is prepared from 70% by weight of an epoxy-modified polyurethane resin, 10% by weight of $Al_2O_3$, 10% by weight of SiC, 0.5% by weight of a leveling agent, 0.5% by weight of a dispersant, 8.5% by weight of a solvent and 0.5% by weight of a curing agent.

Performance Test

The floors prepared in Examples 1-5 are attested for the performance, where the scratch resistance is tested in accordance with the method of "ISO 1518-1"; the abrasion resistance is tested in accordance with the method of "EN13329"; and the micro-scratch resistance is determined in accordance with the method of "EN16094". The results show that the scratch resistance of the floors prepared in Examples 1-5 reaches 2200 g; the abrasion resistance of the floors reaches 1800 rounds; and the micro-scratch resistance of the floors reaches 1-2 level (that is, no scratches are observed on the floor at a distance of 1 m away from the human eye under the irradiation of 100 W light after the scratching is performed at a force of 38 N 50 times).

Comparative Example 1

This example is basically the same as Example 1 except that the degree of polymerization of the epoxy-modified polyurethane resin in the finish paint is 15.

The same performance test is carried out on the floor prepared in Comparative Example 1. The results show that the scratch resistance of the floor prepared in Comparative Example 1 reaches 1500 g; the abrasion resistance of the floor reaches 1300 rounds; and the micro-scratch resistance of the floor reaches level 4 (that is, obvious scratches are observed on the floor at a distance of 1 m away from the human eye under the irradiation of 100 W light after the scratching is performed at a force of 38 N 50 times).

In summary, the floor coating prepared according to the ingredients and compounding ratio provided herein can have good scratch resistance. The scratch-resistant floor containing the above-mentioned floor coating exhibits better scratch and wear resistance. The above-mentioned floor coating has simple preparation, and thus is suitable for industrial production.

The above-mentioned are merely preferred embodiments of this disclosure, and not intended to limit the present disclosure. Modifications, variations and replacements made by those skilled in the art without departing from the spirt of this disclosure should fall within the scope of the present disclosure defined by the appended claims.

What is claimed is:

1. A floor coating, wherein the floor coating is prepared from 55-70% by weight of an epoxy-modified polyurethane resin, 5-10% by weight of $Al_2O_3$, 10-25% by weight of SiC, 0.4-1% by weight of a leveling agent, 0.3-1% by weight of a dispersant, 5-10% by weight of a solvent and 0.2-0.8% by weight of a curing agent;
   wherein a degree of polymerization of the epoxy-modified polyurethane resin is 80-100.

2. The floor coating of claim 1, wherein the floor coating is prepared from 61.5-65% by weight of the epoxy-modified polyurethane resin, 8-10% by weight of $Al_2O_3$, 18-20% by weight of SiC, 0.5-1% by weight of the leveling agent, 0.5-1% by weight of the dispersant, 7.5-10% by weight of the solvent and 0.5-0.8% by weight of the curing agent.

3. A scratch-resistant floor, wherein a surface of the scratch-resistant floor is provided with a scratch-resistant coating layer; and the scratch-resistant coating layer contains the floor coating according to claim 1.

4. The scratch-resistant floor of claim 3, wherein the scratch-resistant coating layer comprises a primer layer and a finish paint layer; and the finish paint layer contains the floor coating.

5. The scratch-resistant floor of claim 4, wherein a content of a primer in the primer layer is 10-15 g/m²; and a content of a finish paint in the finish paint layer is 15-25 g/m².

6. The scratch-resistant floor of claim 4, wherein the scratch-resistant floor further comprises a substrate layer; and the scratch-resistant coating layer is arranged on one side surface of the substrate layer.

7. The scratch-resistant floor of claim 6, wherein the substrate layer is a polyvinyl chloride (PVC) coated substrate layer.

8. The scratch-resistant floor of claim 6, wherein a thickness of the substrate layer is 3-6 mm.

9. The scratch-resistant floor of claim 6, wherein the scratch-resistant floor further comprises a buffer layer; and the buffer layer is arranged on the other side surface of the substrate layer.

10. The scratch-resistant floor of claim 9, wherein a thickness of the buffer layer is 1-1.5 mm.

11. A method for producing the scratch-resistant floor of claim 3, comprising:
    preparing the scratch-resistant coating layer containing the floor coating on a substrate.

12. The method of claim 11, wherein a preparation of the scratch-resistant coating layer comprises:
    applying the floor coating by roller coating;
    wherein a conveying speed of a conveyor belt is 8-14 mm/s; a ratio of the conveying speed of the conveyor belt to a rotating speed of a rubber roller is 1:4.5-5.5; and a temperature of the roller coating of the floor coating is 35-40° C.

13. The method of claim 11, wherein the scratch-resistant coating layer comprises a primer layer; a primer is applied by roller coating; and during the roller coating of the primer, a conveying speed of a conveyor belt is 8-14 mm/s; a ratio of the conveying speed of the conveyor belt to a rotating speed of a rubber roller is 1:4.5-5.5; and a temperature of the roller coating of the primer is 35-40° C.

14. The method of claim 12, wherein the scratch-resistant coating layer comprises a primer layer and a finish paint layer; and the preparation of the scratch-resistant coating layer further comprises:
    before the roller coating, preheating a primer, a finish paint and the floor coating.

15. The method of claim 14, wherein the primer, the finish paint and the floor coating are preheated at 35-40° C. for 1-2 h.

16. The method of claim 14, further comprising:
    before preparing the scratch-resistant coating layer, preheating the substrate until a surface temperature of the substrate is no less than 30° C.

17. The method of claim 14, wherein the primer, the finish paint and the floor coating are subjected to curing after the roller coating.

* * * * *